United States Patent
Otis

(10) Patent No.: US 6,567,905 B2
(45) Date of Patent: May 20, 2003

(54) GENERATIONAL GARBAGE COLLECTOR WITH PERSISTENT OBJECT CACHE

(75) Inventor: Allen J. Otis, Beaverton, OR (US)

(73) Assignee: Gemstone Systems, Inc., Beaverton, OR (US)

( * ) Notice: Subject to any disclaimer, the term of this patent is extended or adjusted under 35 U.S.C. 154(b) by 0 days.

(21) Appl. No.: 09/681,140

(22) Filed: Jan. 23, 2001

(65) Prior Publication Data

US 2002/0099765 A1 Jul. 25, 2002

(51) Int. Cl.[7] .............................................. G06F 12/00
(52) U.S. Cl. ....................... 711/170; 711/165; 707/203; 707/206
(58) Field of Search ................................ 711/165, 170; 707/206, 203

(56) References Cited

U.S. PATENT DOCUMENTS

| | | | | |
|---|---|---|---|---|
| 6,098,089 A | * | 8/2000 | O'Connor et al. | 709/104 |
| 6,148,310 A | * | 11/2000 | Azagury et al. | 707/206 |
| 6,173,294 B1 | * | 1/2001 | Azagury | 707/206 |
| 6,256,637 B1 | * | 7/2001 | Venkatesh et al. | 707/103 |
| 6,308,185 B1 | * | 10/2001 | Grarup et al. | 707/206 |

OTHER PUBLICATIONS

Jones, Richard, Garbage Collection Algorithms for Automated Dynamic Memory Management, 1996, pp. 143–181, John Wiley & Sons, New York.

* cited by examiner

Primary Examiner—Do Hyun Yoo
Assistant Examiner—Ngoc V Dinh
(74) Attorney, Agent, or Firm—Ipsolon LLP

(57) ABSTRACT

A virtual machine object memory structure includes a contiguous region of virtual address space in which objects (i.e., temporary objects) are segregated into a new generation space and an old generation space according to the ages of the objects, as well as a permanent object memory (POM) generation space. The POM generation space operates as a persistent object cache that is not subject to conventional garbage collection processes. The lifetime of an object in the POM generation space relates to the frequency at which objects are copied from a persistent object store (e.g., disk storage) and shared object cache, rather than garbage collection processes relating to the new generation space and the old generation space.

19 Claims, 8 Drawing Sheets

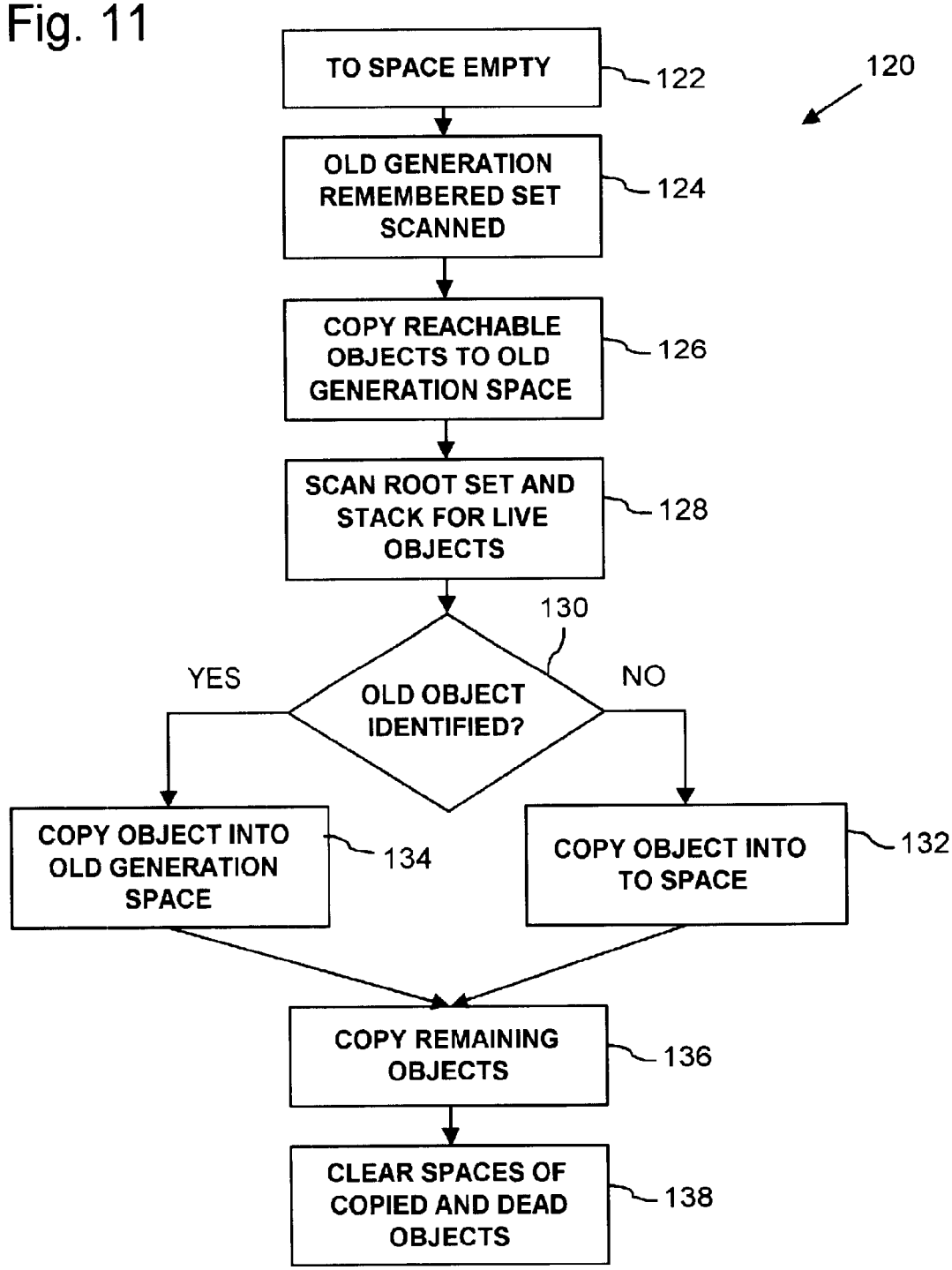

GENERATIONAL GARBAGE COLLECTOR WITH PERSISTENT OBJECT CACHE

SUMMARY OF INVENTION

The present invention relates to garbage collection in virtual machine software and, in particular, to a generational garbage collector with a persistent object cache.

In computer systems, a virtual machine is software that mimics the performance of a hardware device. One example of a virtual machine is a program that allows applications written for x86 format microprocessor (e.g., available from Intel Corporation) to be run on a 68000 format microprocessor (e.g., available from Motorola Corporation). Virtual machine computers, referred to simply as virtual machines hereafter, have been developed recently to provide software that mimics a "complete" computer. One example is the Java™ virtual machine introduced by Sun Microsystems, Inc. and available for a variety of computer platforms to run programs written in the Java™ virtual machine-based programming language. Such a virtual machine functions as a computer platform that hides the operating system of the underlying hardware computer from applets and applications written in the programming language of the virtual machine.

Virtual machines are commonly associated with stand-alone or client-side computers where the virtual machine operates in conjunction with an operating system or an Internet browser, for example. It will be appreciated, however, that virtual machines may also be operated in conjunction with or on a server computer that serves one or more client computers. The clients may be connected to the server directly or by networked connections. One example of a server virtual machine is the Gemstone/J™ 1.0 server virtual machine available from Gemstone Systems, Inc. of Beaverton, Oreg., the assignee of the present invention. Server virtual machines may be used in a variety of applications, including database and transaction applications.

Some virtual machines support access to persistent objects that are stored on disk in a persistent store. Before the execution of a bytecode in such a virtual machine can read or write a field in a persistent object, the object must be copied into the virtual machine object memory so that the object can be assigned a memory address. The copy of the persistent object is then subject to normal garbage collection rules and movement in memory, as is known in the art.

Some prior virtual machine implementations include an object memory structure that includes a contiguous region of virtual address space in which objects (i.e., temporary objects) are segregated into a new generation space and an old generation space according to the ages of the objects. Objects are first allocated to the new generation space in a copy-on-read operation in which, for example, a temporary copy of a persistent object is copied from a persistent object stored in a persistent object memory, such as disk storage. In accordance with conventional generational garbage collection, surviving objects in the new generation space are promoted or copied to the old generation space.

Commonly, most of the copies of permanent objects in the new generation space will be deleted during a garbage collection because only a few of the objects are typically referenced or reachable from the virtual machine (e.g., Java) execution stack at any one time. This can cause the lifetime of objects in the new generation space to be quite brief and can require repeated copying of objects from a persistent store, thereby reducing performance.

To improve performance, an application program executing in a virtual machine needs to have a reasonable percentage of it's working set of persistent objects available in memory, and in particular have copies of the persistent objects in the virtual machine object memory. Accordingly, the present invention includes an object memory structure that includes a contiguous region of virtual address space in which objects (i.e., temporary objects) are segregated into a new generation space and an old generation space according to the ages of the objects, as well as a permanent object memory (POM) generation space.

The POM generation space operates as a persistent object cache that is not subject to conventional garbage collection processes. This makes possible a very large POM generation space without a corresponding increase in the cost of garbage collection. By contrast, enlarging the old generation space could greatly increase the cost of garbage collection. Also, the lifetime of an object in the POM generation space relates to the frequency at which objects are copied from a persistent object store (e.g., disk storage) and shared object cache, rather than garbage collection processes relating to the new generation space and the old generation space. Whenever the POM generation space is full, live objects are copied from the POM generation space to the new generation space to make way for new temporary objects to be copied from the persistent object store or shared object cache. Once copied to the new generation space from the POM generation space, objects are subject to conventional garbage collection processing.

The lifetimes of objects in the POM generation space relate to the overall traffic of objects being copied from the persistent object memory rather than conventional garbage collection criteria. Objects that are recently copied from the persistent object memory are less likely to be garbage collected prematurely, as can frequently happen in conventional systems. Accordingly, performance can be improved for an application program executing in a virtual machine.

Additional objects and advantages of the present invention will be apparent from the detailed description of the preferred embodiment thereof, which proceeds with reference to the accompanying drawings.

BRIEF DESCRIPTION OF DRAWINGS

FIG. 11 is a flow diagram of a generational garbage collection scavenge process that operates in conjunction with the permanent object memory (POM) generation space.

DETAILED DESCRIPTION

Figure 1:
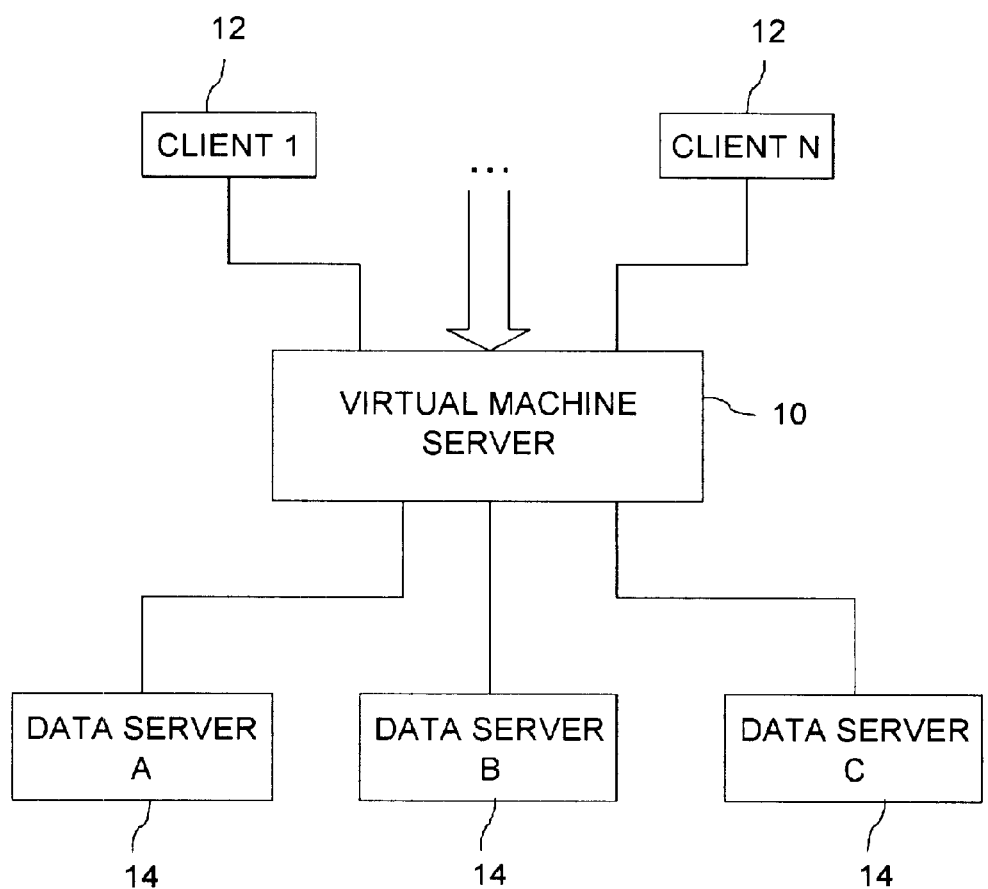
FIG. 1 is a block diagram showing an exemplary use of a virtual machine server according to the present invention.

FIG. 1 is a block diagram showing an exemplary use of a virtual machine server 10 according to the present invention in a three-tier system architecture for distributed database and transaction computing. It will be appreciated that this implementation of virtual machine server 10 is exemplary and does not limit the applications in which virtual machine server 10 may be used. In this illustration, a client layer represented by any number of multiple clients 12 handles user interface actions and local processing involving small amounts of data.

A middle application server layer is represented by one or more virtual machine servers 10 (only one shown) that handle information, in the form of objects, including sharing of objects between clients and executing methods on the objects. A data server layer represented by one or more data servers 14 handles storage and retrieval of data, including relational database access. In large-scale enterprise computing this architecture can support hundreds or thousands of clients 12 and many millions of objects.

In a transactional database environment, each client 12 retrieves information (e.g., objects) from and stores information (e.g., objects) to one or more shared databases on data servers 14. An expectation of such an environment is that it must maintain the reliability of transactions and the integrity of the objects in the database. These expectations have been enumerated as requiring the transactional database environment to provide Atomic committal of transactions, Consistent views of objects, Isolation of changes to objects, and Durable committal of transactions, which is sometimes summarized by the acronym ACID.

As is known in the art, the atomic committal of transactions expectation requires that information or objects for a transaction be committed to persistent storage on an all-or-nothing basis. The consistent views of objects expectation requires that each of multiple users is provided a consistent view, as of the begin point of the transaction, of information or objects that have been committed to persistent storage. The isolation of changes to objects expectation requires that changes made to temporary objects or information in one transaction are not visible to other transactions until the changes are committed. The durable committal of transactions expectation requires that objects committed to persistent storage remain durable (i.e., unchanged) until subsequent changes are committed. Durable commit means that once a successful commit status is returned to the user, the changes must survive subsequent operating system or power failures.

In this exemplary illustration, virtual machine server 10 provides one or more virtual machines for executing software based upon a virtual machine-based programming language such as Java™ programming language promulgated by Sun Microsystems, Inc. Clients 12 may be personal or network computers running a network browser, such as Navigator from Netscape Corporation or Internet Explorer from Microsoft Corporation, or a dedicated user interface written in the Java™ programming language, for example. In other cases, one or more of clients 12 may take the form of unattended personal or network computers that function as machine controllers in a factory.

Clients 12 may communicate with virtual machine server 10 through any of a variety of formats or protocols that include, for example, TCP/IP, HTTP, and IIOP (the Internet Inter-ORB Protocol for CORBA objects). Virtual machine server 10 may communicate with data servers 14 through a database access interface such as JDBC (Java Database Connectivity). Moreover, it will be appreciated that virtual machine server 10 and each of clients 12 will typically have a conventional computer configuration that may include a high speed processing unit (CPU) in conjunction with a memory system (with volatile and/or non-volatile memory), an input device, and an output device, as is known in the art.

Figure 2:
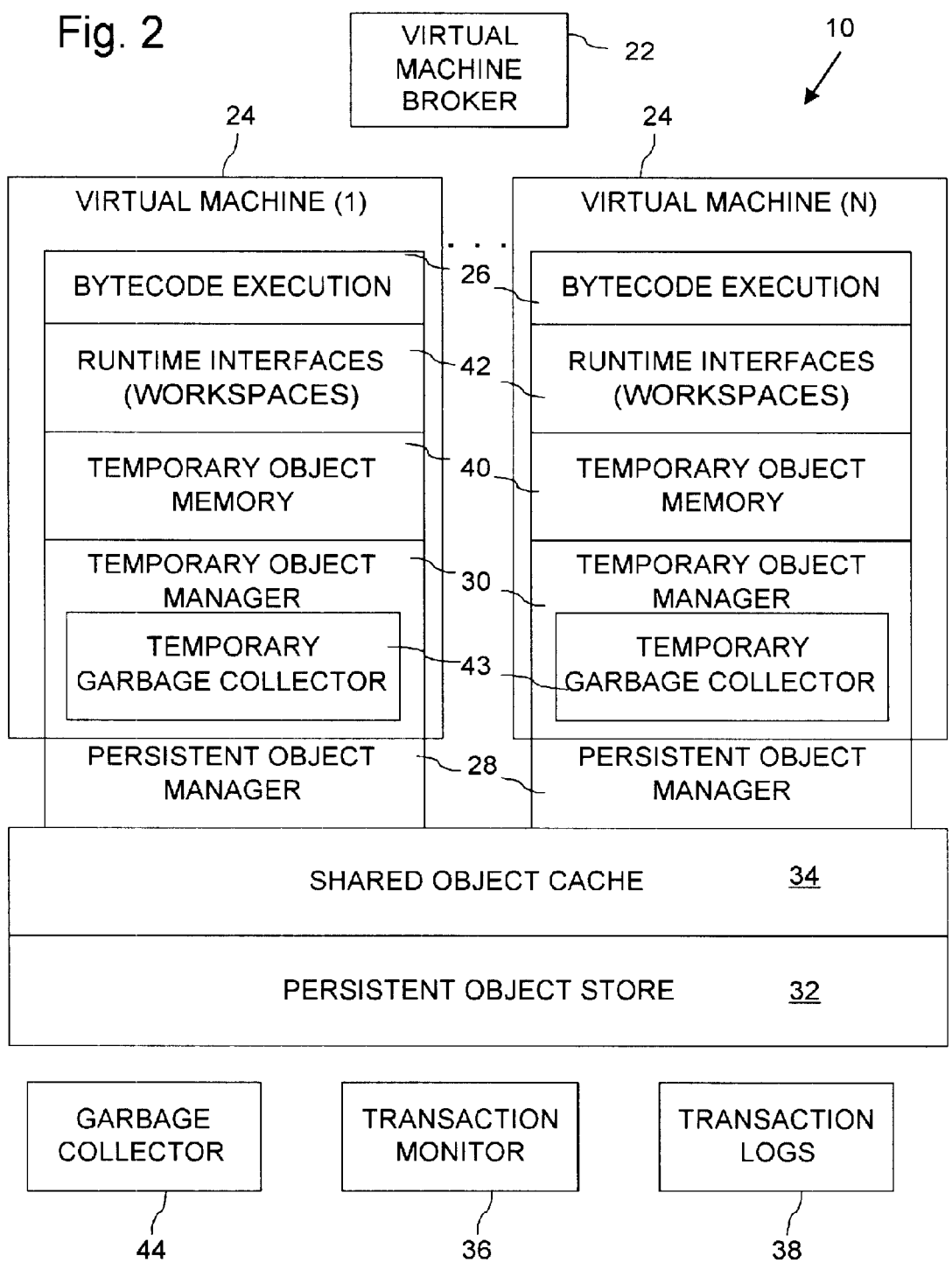
FIG. 2 is a block diagram illustrating the architecture of an exemplary virtual machine server.

FIG. 2 is a block diagram illustrating the architecture of exemplary virtual machine server 10. For purposes of illustrating details of virtual machine server 10, the following description is directed to an implementation for executing software based upon the Java™ virtual machine-based programming language. It will be appreciated, however, that the present invention is similarly applicable to other virtual machine-based programming languages.

A virtual machine broker 22 manages a pool of N-number of server virtual machines 24 that may be selectively activated and are simultaneously operable. Virtual machine broker 22 receives at a designated communication port (not shown) requests for client services sent from clients 12. Virtual machine broker 22 assigns the client services to virtual machines 24 and can start virtual machines 24 or terminate them according to the client services being requested. Virtual machine broker 22 may also enforce login authentication of clients 12 requesting client services. In this implementation, each virtual machine 24 runs software in the Java programming language.

Each virtual machine 24 includes a bytecode execution module 26 that executes Java language programs. Such programs were originally written in the Java language and have been compiled into bytecodes. As is known in Java language programming, bytecodes are binary, machine-independent representations of a program that represent the program using a stack-oriented instruction set. As part of executing the bytecodes, virtual machine 24 may execute the bytecodes with an interpreter or may translate some or all of the bytecodes to machine instructions native to the underlying computer. Java programs may include native methods, which are portions of the program written in a language other than Java (such as the C programming language) and separately compiled into machine instructions native to the underlying computer. Native methods can be used to provide access from the Java language to operations within the virtual machine not accessible from the bytecode instruction set.

A persistent object manager 28 and a temporary object manager 30 in each virtual machine 24 operate on persistent and temporary objects, respectively, within the virtual machine 24. Within a multi-user database or transaction computing system, information in the database is stored, retrieved, created, and deleted as objects. The objects are asynchronously created, retrieved, changed and dereferenced by multiple independent users. Object managers 28 and 30 manage these activities to maintain the integrity of persistent or permanent objects (i.e., objects that have been fixed or committed in the database for system-wide use) and the views that the multiple users have of the persistent objects.

Object manager 30 provides users with new temporary objects and copies of persistent objects held in persistent object store 32. Object manager 28 locates persistent objects within object store 32 and can convert to persistent objects temporary objects passed from temporary object manger 30. In one implementation, the functionality of persistent object manager 28 and temporary object manager 30 are provided by an integrated object manager. The following description is directed to separate persistent and temporary object managers, but is similarly applicable to an integrated object manager.

With regard to persistent or permanent objects, persistent object manager 28 manages retrieval of objects from and storage of objects in a persistent object store 32 (i.e., disk I/O), and memory page allocation for reading and writing persistent objects and caching them in a shared object cache 34 shared by all the virtual machines 24. Persistent object memory includes shared object cache 34 and the persistent object store 32. In addition, persistent object manager 28 communicates with a resource monitor 36 that manages shared resources (allocates persistent object identifiers, allocates memory blocks in persistent store) and enforces transaction integrity by recording changes to persistent objects in one or more transaction logs 38. Transaction logs 38 provide complete point-in-time roll-forward recovery.

With regard to temporary objects, temporary object manager 30 manages creation of temporary objects and creation of temporary copies of persistent objects in a temporary object memory 40 associated with multiple workspaces 42 for modification, deletion, or other manipulation by a user. Multiple workspaces 42 share a temporary object memory 40. All new and modified objects in the workspaces 42 are contained in the temporary object memory 40 until the transaction is committed.

Within the context of a transactional database application, a workspace 42 is a database session that is initialized by a user beginning a transaction. The transaction execution continues by accessing a graph or set of objects, sometimes called the working set, until the transaction is either committed to the database or the transaction is aborted. Objects read by different workspaces 42 may be held in shared object cache 34.

As is typical for Java language execution, each virtual machine 24 on virtual machine server 10 includes its own distinct temporary garbage collector 43, which is part of the temporary object manager 30. In this implementation, modified copies of persistent objects (sometimes referred to as "dirty" objects) are identified in a dirty object listing that is stored in temporary object memory 40. In particular, the dirty object listing lists all copies of persistent objects (i.e., objects that were copied from the persistent store) that have been modified by a workspace or within a transaction. Objects identified in the dirty object listing are protected from garbage collection until after the transaction involving the dirty objects is committed or aborted, as described below in greater detail. The dirty object listing or dirty set is a well-known object that the garbage collector 43 includes as part of its "root set", using techniques well known in the art of building garbage collectors. The persistent object store includes a persistent garbage collector 44, which performs garbage collection of persistent objects in a manner that does not conflict with transaction processing.

In one implementation, virtual machine server 10 operates in a multi-threaded computer system, and each virtual machine 24 includes multiple threads and can support multiple simultaneous workspaces 42. Within each workspace 42, multiple threads are able to access objects simultaneously. Moreover, threads are orthogonal to workspaces 42 so that threads are not locked to particular workspaces 42, workspaces 42 are not locked to particular threads, and the sizes of the workspaces 42 are configurable to the requirements of the transactions within the workspaces. In a virtual machine server 10 with fewer threads than workspaces 42, this allows threads to be used by one workspace 42 after another. In an alternative implementation, each server virtual machine may have a single workspace that is tied to a single processing thread. However, virtual machines 22 in the illustrated implementation require less system memory and processing resources and hence can serve greater numbers of client services at greater speed than can server virtual machines in the alternative implementation.

It will be appreciated that multiple simultaneous workspaces and multiple simultaneous threads may be provided whether virtual machine 24 is operated on a computer having one or multiple CPUs 24. Such a concept of simultaneity of threads is a common construct. As is known in the art, however, the multiple simultaneous threads on a computer having only one CPU are actually time-multiplexed such that only one thread is actually being processed at a time. A computer having multiple CPUs may actually process as many threads simultaneously as there are CPUs.

Figure 3:
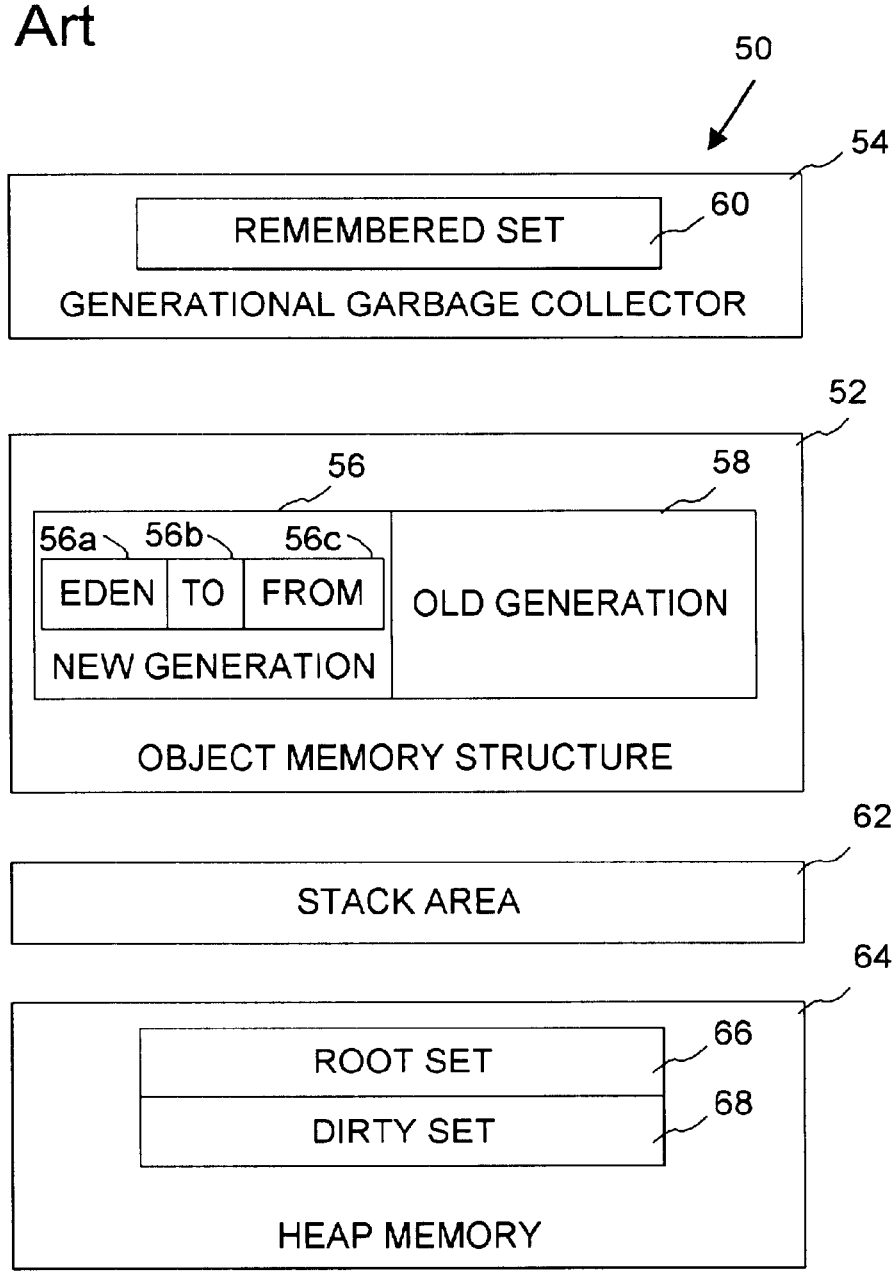
FIG. 3 is a block diagram of a prior art virtual address space representing contents of a virtual machine memory.

FIG. 3 is a block diagram of a prior art virtual address space 50 representing contents of a virtual machine memory. In one implementation, virtual address space 50 includes an object memory structure 52 and a generational garbage collector 54 that may correspond to temporary object memory 40 and temporary garbage collector 43, respectively.

Object memory structure 52 includes a contiguous region of virtual address space in which objects (i.e., temporary objects) are segregated into a new generation space 56 and an old generation space 58 according to the ages of the objects. Objects are first allocated to new generation space 56 in a copy-on-read operation in which, for example, a temporary copy of a persistent object is copied from a persistent object stored in persistent object store 32 (e.g., FIG. 2), such as disk storage. In accordance with conventional operation of generational garbage collector 54, surviving objects in new generation space 56 are promoted or copied to old generation space 58.

Virtual address space 50 includes a Remembered Set 60 for garbage collector 54, a stack area 62 for each thread that is executing bytecodes, and a variable sized heap memory area 64 shared by all threads for data that are not managed by garbage collector 54. Remembered Set 60 is a separate contiguous region of virtual address space 50 where, in one implementation, one byte in Remembered Set 60 corresponds to N-number of bytes of object memory 52, with N typically being equal to 512. Any store into (i.e., modification of) a field of an object in object memory 52 sets the corresponding byte in Remembered Set 60 to 1 to indicate that an object has been modified. In operation, garbage collector 54 scans Remembered Set 60 to find such modifications and new references from old generation space 58 to new generation space 56 according to standard generational garbage collection techniques.

In addition to Remembered Set 60, garbage collector 54 utilizes a Root Set 66. Root Set 66 is a list in heap memory area 64 containing references to temporary objects that form a start point of an object "reachability analysis," as well as the Java evaluation stack of each thread (in a Java-based implementation). A Dirty Set 68 is a subset of Root Set 66 referencing DirtyList objects located in object memory 52. Each DirtyList object is an array of objects for each transactional workspace containing references to modified persistent objects. When a persistent object is modified for the first time since being copied that object is added to the DirtyList object for the corresponding transactional workspace. The purpose of Dirty Set 68 is to prevent dirty objects from being garbage collected until after the transactional workspace is committed to the persistent store.

Garbage collector 54 conducts two kinds of garbage collection: Scavenge and Mark Sweep. A scavenge is executed each time new generation space 56, or a segment of it, becomes full. Periodically, a scavenge is promoted to a complete mark sweep of all object memory based on various heuristics embodied in garbage collector 54, such as when old generation space 58 is full. In addition to Mark Sweep, other garbage collection algorithms, such as one known as "Train Collector," may be used within old generation space 58.

More specifically, new generation space 56 may include an Eden space 56a, a To space 56b, and a From space 56c. Objects are first allocated to Eden space 56a of new generation space 56 in a copy-on-read operation. A Scavenge garbage collection is conducted whenever Eden space 56a is full. At the beginning of a Scavenge, To space 56b is empty. The Scavenge first scans in old generation space 58 all objects that are marked in Remembered Set 60 to find any objects in new generation space 56 that are live by reason of a reference from old generation space 58. Objects found in this scan are copied by the Scavenge directly from new generation space 56 to old generation space 58 (e.g., see process block 126 below). As is known in the art, "live" means that the object is transitively reachable from stack 62 or root set 66. Objects that are not live are by definition dead.

The Scavenge garbage collection then identifies live objects that are transitively reachable from stack area 62 or Root Set 66 or from objects copied to old generation space 58 and moves to To space 56b any live objects still in Eden space 56a or From space 56c. Whenever To space 56b is full, remaining live objects in From and Eden spaces 56a and 56c are moved to old generation space 58. At the end of the Scavenge, From space 56c is set to empty and the names of To space 56b and From space 56c are swapped, so that the now empty From space 56c becomes To space 56b for the next Scavenge.

Mark sweep garbage collection is conducted when old generation space 58 is full. Mark sweep garbage collection identifies and marks all live objects in memory area 52 that are transitively reachable from stack area 62 or reachable from root set 66 or dirty set 68. All other objects in object memory structure 52 are deemed inactive and the memory they occupy is reclaimed by compacting each of the memory areas within 52 (i.e., spaces 56a, 56c, and 58, To space 56b is already empty).

With conventional garbage collection, most objects in new generation space 56 will commonly be discarded, since only a few of them are typically reachable from the Java execution stack at any one time. Thus, the lifetime of objects in new generation space 56 is typically quite brief, and the best that can be done is to provide efficient refrom shared object cache 34. Under these circumstances, the working set of persistent objects consists of some objects in new generation space 56 and many objects in shared object cache 34. Objects in the shared object cache 34 are accessible via a hash table that maps persistent object identifiers to locations in the cache 34, so these objects may be accessed without a disk read. However, the cost of repeatedly copying objects from cache 34 to new generation space 56 appreciably reduces performance.

Figure 4:
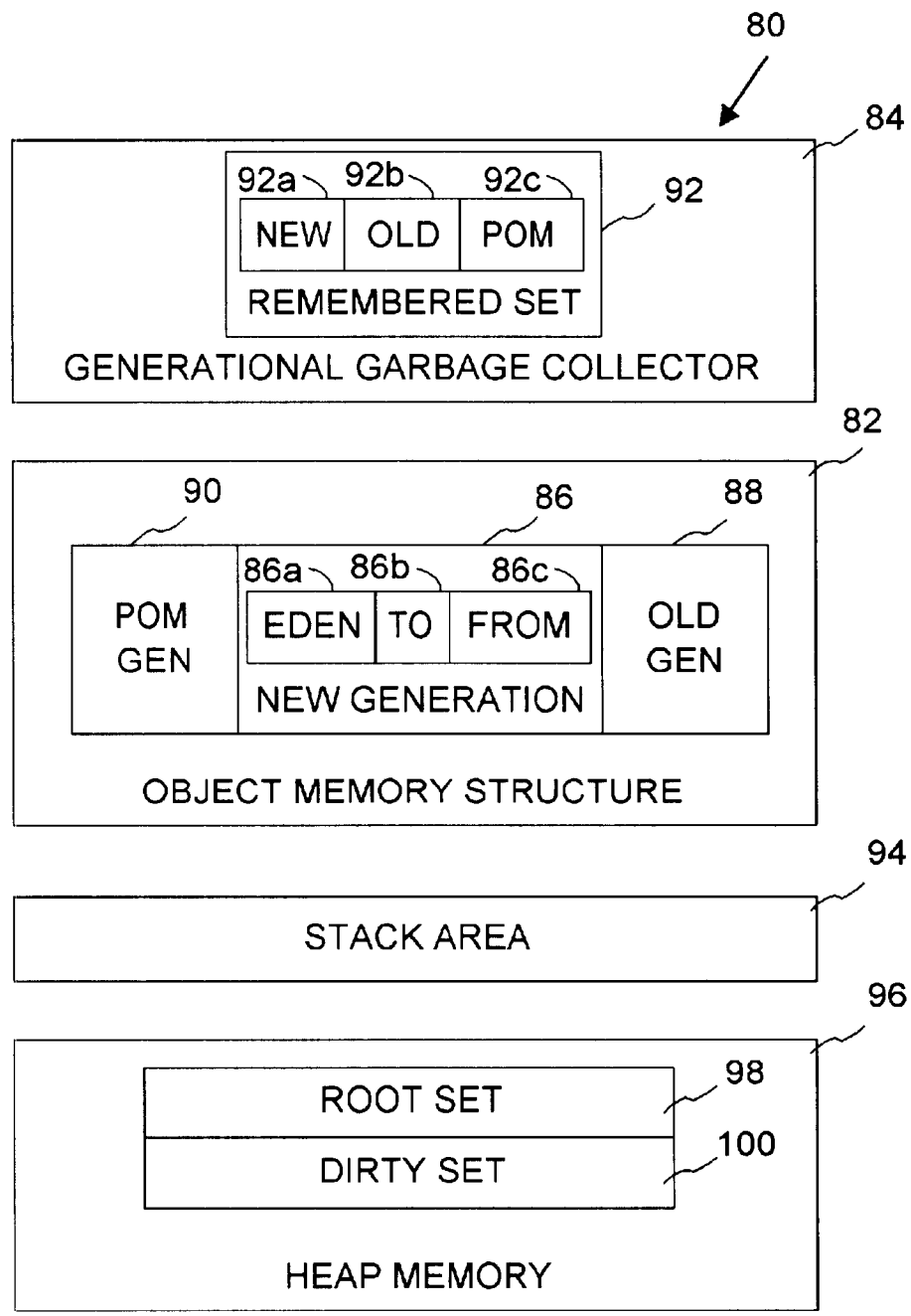
FIG. 4 is a block diagram of a virtual address space representing contents of a virtual machine memory according to the present invention.

FIG. 4 is a block diagram of a virtual address space 80 representing contents of a virtual machine memory according to the present invention. Virtual address space 80 includes an object memory structure 82 and a generational garbage collector 84 that may correspond to respective temporary object memory 40 and temporary garbage collector 43 of FIG. 2.

Object memory structure 82 includes a contiguous region of virtual address space in which objects (i.e., temporary objects) are segregated into a new generation space 86 and an old generation space 88 according to the ages of the objects, as well as a permanent object memory (POM) generation space 90 according to the present invention.

In one implementation, an object that is copied from persistent object store 32 into POM generation space 90 and has a reference to another object is left in the form of a persistent objectId. The object is not converted to a direct reference to another object. In the art of persistent stores, this treatment of object references is often called "lazy swizzling.". Within POM generation space 90, only those objects reachable from the DirtySet 100 are allowed to directly reference other objects.

Virtual address space 80 includes a Remembered Set 92, a stack area 94 for each thread that is executing bytecodes, and a variable sized heap memory area 96 shared by all threads for data that are not managed by garbage collector 84. Live objects may include those in POM generation space 90 that are reachable by or from stack area 94. Once copied to new generation space 86 from POM generation space 90, objects are subject to conventional garbage collection processing, as described with reference to FIG. 3.

Remembered Set 92 is a separate contiguous region of virtual address space 80 that includes a new generation remembered set 92a, and old generation remembered set 92b, and a POM generation remembered set 92c corresponding to objects in, respectively, new generation space 86, old generation space 88, and POM generation space 90. In one implementation, one byte in Remembered Set 92 corresponds to N-number of bytes of object memory, with N typically being equal to 512. Any store into (i.e., modification of) a field of an object sets the corresponding byte in Remembered Set 92 to 1 to indicate that an object has been modified. Likewise, any store into an object in POM generation space 90 will cause a byte to be set in POM generation remembered set 92c. This design does not require extra conditional branches in the store barrier logic, so the store barrier logic does not have to test whether the object being stored into is in POM generation space 90. Maintaining a minimal amount of code in the store barrier implementation is important to virtual machine performance.

In operation, garbage collector 84 scans old generation remembered set 92b to find modified objects and new references from old generation space 88 to new generation space 86 according to standard generational garbage collection techniques. With POM generation space 90 not being subject to conventional garbage collection processes, POM generation remembered set 92c is not scanned by garbage collector 84.

In addition to Remembered Set 92, garbage collector 84 utilizes a Root Set 98. Root Set 98 is a list in heap memory area 96 containing references to temporary objects that form a start point of an object "reachability analysis," as well as the Java evaluation stack of each thread (in a java-based implementation). Dirty Set 100 is a subset of Root Set 98 referencing DirtyList objects located in object memory 82. Each DirtyList object is an array of objects for each transactional workspace containing references to modified persistent objects. When a persistent object is modified for the first time since being copied that object is added to the DirtyList object for the corresponding transactional workspace.

New generation space 86 includes an Eden space 86a, a To space 86b, and a From space 86c. Objects are first allocated to Eden space 86a of new generation space 86 in a copy-on-read operation. A Scavenge garbage collection is conducted whenever Eden space 86a is full. Preconditions at the start of a Scavenge are that To space 86b is empty and From space 86c contains objects in new generation space 86 that survived the previous Scavenge.

Scavenge garbage collection first processes remembered set 92 by scanning only old generation remembered set 92b to identify in Eden space 86a or To space 86b objects or POM generation space 90 that are referenced by or reachable from objects in old generation space 88. Any such identified objects are copied from new generation space 86 or POM generation space 90 to old generation 88. Because of the processing of Dirty Set 100 as part of Root Set 98 it is not necessary to scan POM generation remembered set 92c.

The Scavenge garbage collection then identifies live objects that are reachable from stack area 94, Root Set 98, or Dirty Set 100, and moves to To space 86b any live objects in Eden space 86a or From space 86c or POM generation space 90. "Live" means that the object is transitively reachable from stack 94 or root set 98. Objects that are not live are by definition dead. Whenever To space 86b becomes full during a Scavenge, remaining live objects in Eden space 86a are moved to old generation space 88. At the end of the Scavenge, From space 86c is set to empty and the names of To space 86b and From space 86c are swapped, so that the now empty From space 86c becomes To space 86b for the next Scavenge.

Mark sweep garbage collection is conducted when old generation space 88 is full. Mark sweep garbage collection identifies and marks all live objects in object memory 82 by doing a transitive closure (the mark phase), starting from root set 98 and dirty set 100 and traversing all live objects. All other objects in object memory structure 82 are deemed dead (inactive), and the memory they occupy is reclaimed by the sweep phase, which compacts each of the memory areas 86a, 86c, 88 (To space 86b is already empty). Objects in POM generation space 90 are followed by the mark phase to the extent that those objects are reachable by direct object references from objects outside of POM generation space 90, but compaction of the POM generation space 90 is not necessary. The hash tables which map persistent objectIds to objects in POM generation space 90 need not be followed, and references between POM generation objects that are in the form of persistent objectIds need not be followed.

POM generation space 90 operates as a persistent object cache that is not subject to conventional garbage collection processes. A persistent object being read from shared object cache 34 or persistent object store 32 into object memory 82 is copied into POM generation space 90. If POM generation space 90 is full and a Scavenge has not yet occurred, or if the object is exceptionally large, the object may be copied instead to Eden Space 86a.

The lifetime of an object in POM generation space 90 relates to the frequency at which objects are copied from persistent object store 32 and shared object cache 34, rather than garbage collection processes relating to new generation space 86 and old generation space 88. Whenever POM generation space 90 is full, a Scavenge is requested and the next Scavenge will copy live objects from POM generation space 90 to new generation space 86 to make way for more new temporary objects to be copied from persistent object store 32 or shared object cache 34.

As described above, a Scavenge does not have to scan POM generation remembered set 92c, and a mark sweep garbage collection need not compact POM generation spaces 90. As described below with reference to FIGS. 6–10, POM generation garbage collection minimizes movement of objects by resetting address spaces (e.g., oldest space to empty, etc.) after a normal scavenge.

These characteristics make possible a very large POM generation space 90 without a corresponding increase in the cost of Scavenge or mark sweep garbage collection. By contrast, a very large old generation space would increase the cost of Scavenge garbage collection because of a larger old generation remembered set to be scanned and greatly increase the cost of mark sweep garbage collection because of the greater number of live objects to scan. With the present invention, mark sweep garbage collection will only traverse those POM generation objects that are referenced from objects in other generations, or are in the dirty list.

In one implementation, each copy of a persistent object in the object memory 82 has an associated persistent ObjectID that uniquely identifies the object. Whenever an object is copied into POM space 90 in a copyoperation, the ObjectID of the object is entered into a hash table 91 that translates the ObjectID to a virtual machine memory location where the object is located. Thus a given object is only copied once for a given workspace, and subsequent references to that ObjectID during bytecode execution for a given workspace will resolve to the copy already in POM generation space 90. If a live object is copied from POM generation space 90 to new generation space 86, then the hash tables are updated so lookups by the ObjectId will still find the new memory location of the object.

Figure 5:
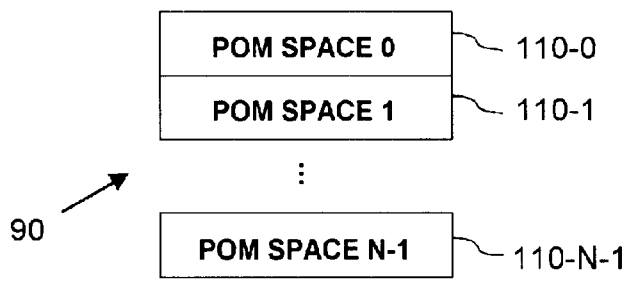
FIG. 5 is a block diagram generally illustrating an exemplary implementation of a permanent object memory (POM) generation space of the present invention.

FIG. 5 is a block diagram generally illustrating an exemplary implementation of POM generation space 90 as a rotating or circular pool of N-number (e.g., 10) of memory or address spaces 110, designated Pom space 0, Pom space 1, . . . , Pom space N-1. For example, address spaces 110 may each be of equal size. Initially, all address spaces 110 are empty and a copyoperation copies permanent objects into Pom Space 0. When Pom Space 0 is full, copycopies objects into Pom Space 1, etc.

When Pom space N-1 (e.g., POM space 10) becomes full, the next copyattempt will request a Scavenge, and that next Scavenge will also perform a POM generation collection. A POM generation collection is the last phase of the Scavenge (after renaming To and From spaces 86b and 86c) and includes setting the oldest Pom space to empty and renaming the oldest Pom Space to be the youngest Pom space. No other object copying or analysis of POM generation space 90 is required, since the preceding copying operations of the Scavenge have already copied any live objects out of the Pom space that will be set to empty. It will be appreciated that the POM garbage collection is separate from the conventional garbage collection of new generation space 86 and old generation space 88. Garbage collection of spaces 86 and 88 needs to do very little special work to account for POM generation space 90, and the inverse also holds.

The lifetimes of objects in POM generation space 90 relate to the overall traffic of objects being copied from persistent object store 32 rather than conventional garbage collection criteria. Objects that are recently copied from persistent object store 32 are less likely to be garbage collected prematurely, as can frequently happen in conventional systems. As a result, conventional garbage collection systems can require additional disk reads to re-copy objects from persistent object store 32 and corresponding decreases in execution efficiency.

In one implementation, POM generation space 90 has a configurable maximum size so as not to grow without bounds and thus cause excessive swapping or paging of virtual machine 24 by the operating system. POM generation space 90 operates independently of generational garbage collector 84 and will not significantly slow its operation.

Figure 6:
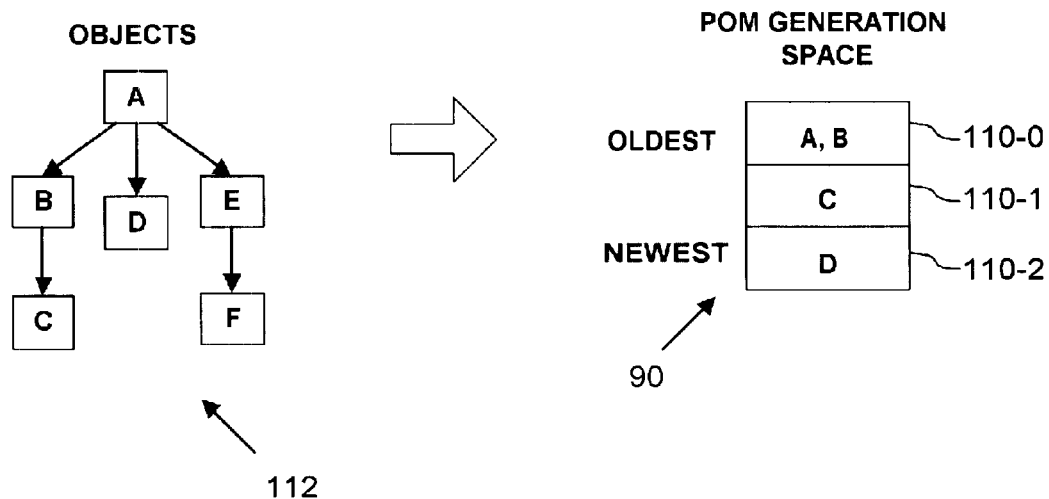
FIG. 6 shows an initial condition for a diagrammatic illustration of garbage collection for the POM generation space.
Figure 7:
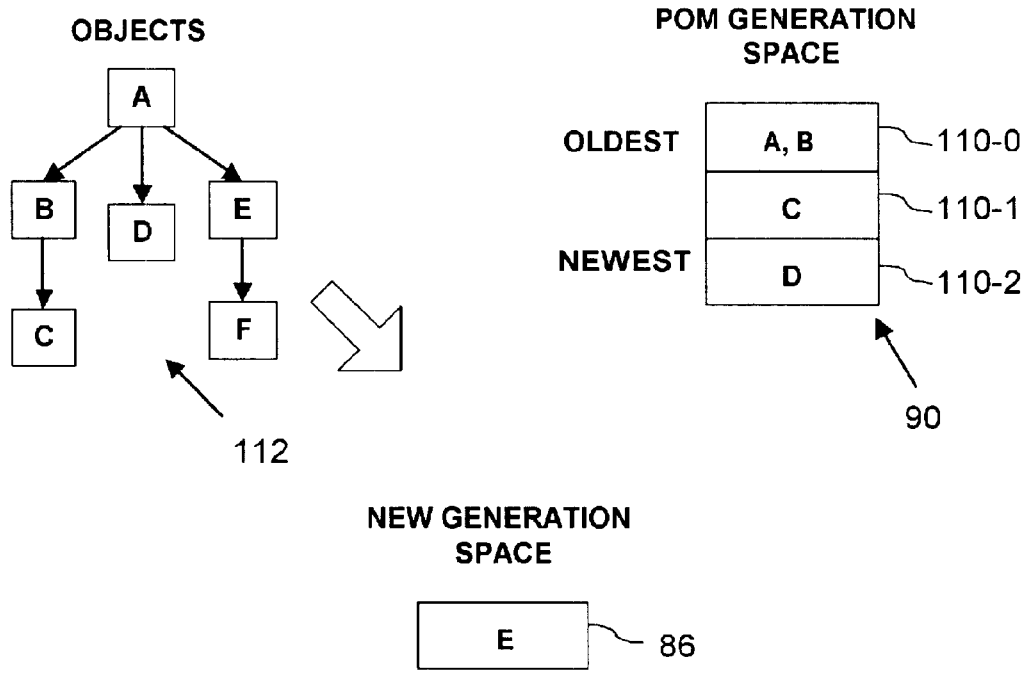
FIG. 7 illustrates an object being copied on read to a new generation space if the POM generation space is full.
Figure 8:
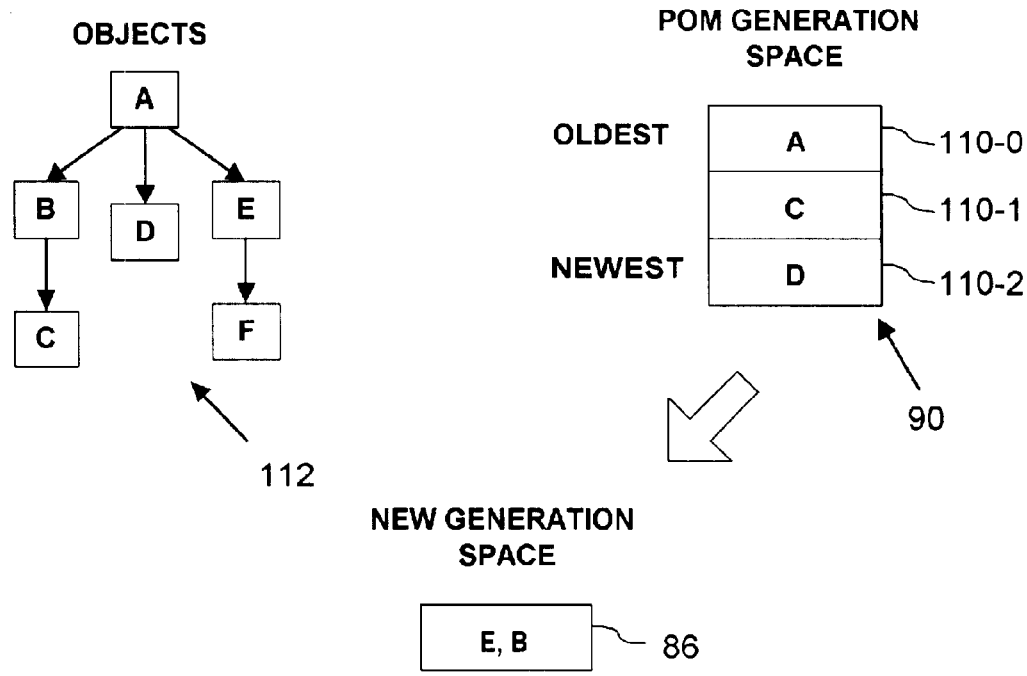
FIG. 8 illustrates the oldest live object being copied from the POM generation space as part of a Scavenge garbage collection.

FIGS. 6–10 are a diagrammatic illustration of the operation of POM generation space 90 with respect to multiple linked objects 112 that are copied successively from the persistent object memory. In this illustration, POM generation space 90 is shown with only three memory or address spaces 110 that each contains one or more objects 112 (e.g., ObjectIDs for objects 112). It will be appreciated that POM generation space 90 would typically include many more than three memory or address spaces 110 and that each could typically contain more than the maximum of two objects 112 illustrated. FIGS. 6–8 illustrate that POM generation space 90 exhibits approximately least-recently-used (LRU) preemption behavior in that the oldest objects in POM generation space 90 currently being used are preempted or POM garbage collected.

FIG. 6 shows an initial condition in which objects 112A–112D have been copied into POM generation space 90 in alphabetic sequence and fill POM generation space 90. Memory or address space 110-0 first receives objects 112A and 112B, then memory space 110-1 receives object 112O, and then memory space 110-2 receives object 112D. Accordingly, the oldest objects in POM generation space 90 are objects 112A and 112B, and the newest is object 112D.

With POM generation space 90 full, an attempt to load object 112E into POM generation space 90 will request that a POM garbage collection of POM generation space 90 be done on the next Scavenge. This will allow a subsequent object (e.g., object 112F) to be loaded into POM generation space 90 after the Scavenge. Object 112E is copied on read to new generation space 86 (i.e., into To space 86b), as shown in FIG. 7. It is assumed that a Scavenge then occurs.

The oldest object 112 in POM generation space 90 that is live or reachable by stack area 94 is copied to new generation space 86. For example, objects 112B, 112C, and 112D could have been successively read into POM generation space 90 in response to operations occurring in or calls from stack area 94, and object 112A could have been read into POM generation space 90 to provide initial access to object 112B.

In this example, object 112B is assumed to be reachable from stack 94, root set 98, or an object in old generation space 88 marked in remembered set 92, so object 112B is the oldest live object. Accordingly, FIG. 8 illustrates that object 112B is copied to new generation space 86 (i.e., To space 86b). Although not illustrated, object 112B may alternatively be copied to old generation space 88 if object 112B is marked in remembered set 92 as being reachable from an object in old generation space 88. This copying of object 112B is independent of whether a POM Scavenge is needed.

Figure 9:
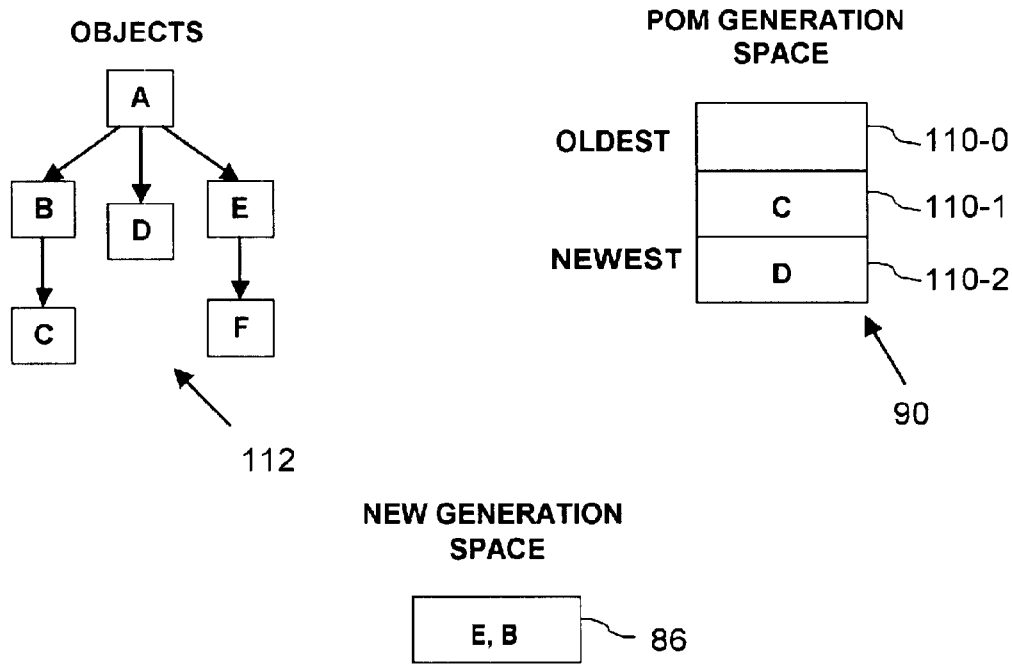
FIG. 9 illustrates a POM memory space being cleared as part of a POM Scavenge.
Figure 10:
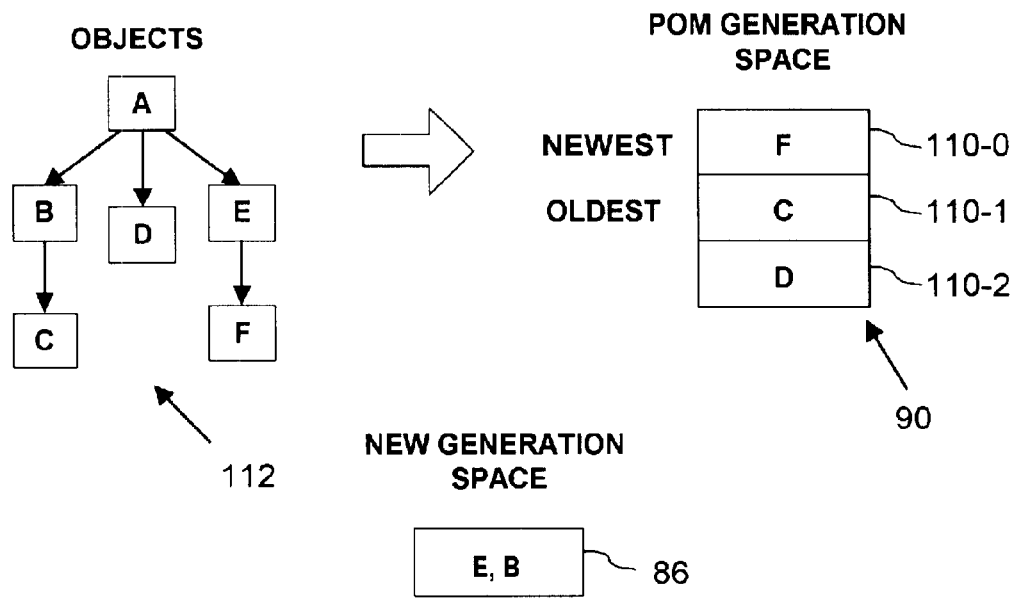
FIG. 10 illustrates an object being copied on read into the cleared POM memory space.

FIG. 9 illustrates that at the end of the Scavenge, since a POM Scavenge is needed, memory space 110-0 is reset to empty. Thus the copy of object 112A is discarded as dead. FIG. 10 illustrates that object 112F is read copied to memory space 110-0, which now has the newest object 112F, and memory space 110-1 now has the oldest object 112C. It will be appreciated that the designation of object age (e.g., oldest to newest) in POM generation space 90 may be achieved by shifting objects 112 in the memory spaces 110 so that the oldest is at the top of the stack, or may be achieved by maintaining a pointer to the memory space 110 with the oldest object 112 and reading from the memory spaces 110 in a circular sequence therefrom.

FIG. 11 is a flow diagram of a generational garbage collection scavenge process 120 that operates in conjunction with permanent object memory (POM) generation space 90. In one implementation, garbage collection scavenge process 120 is executed whenever Eden space 86a is full.

Process block 122 indicates an exemplary initial condition in which To space 86b is empty.

Process block 124 indicates that garbage collector 84 scans old generation remembered set 92b to identify any object that is referenced or reachable from old generation space 88 and located in Eden space 86a or From space 86b, or POM generation space 90.

Process block 126 indicates that identified reachable objects are copied directly to old generation space 88. This copying occurs because remembered set 92a and 92b will be cleared at the end of the Scavenge and so the objects cannot be copied to To space 86b. Objects are copied from POM generation space 90 to satisfy references from temporary objects to persistent objects. The processing of Dirty Set 100 only takes care of references from persistent objects to temporary objects or from persistent objects to other persistent objects. A "not-dirty" persistent object contains only persistent objectId references, no direct memory references, and so the not dirty persistent objects need no processing.

Process block 128 indicates that root set 98 (including dirty set 100) and stack area 94 are scanned to find live objects that are in Eden space 86a or From space 86c or POM generation space 90.

Inquiry block 130 represents an inquiry as to whether an object identified at process block 128 is older than a predetermined age according to heuristics implemented in garbage collector 84. Whenever an identified object is not older than a predetermined age, inquiry block proceeds to process block 132. Whenever an identified object is older than a predetermined age, inquiry block proceeds to process block 134.

Process block 132 indicates that the identified object is copied from Eden space 86a or From space 86c, or POM generation space 90 into To space 86b.

Process block 134 indicates that the identified object is copied from Eden space 86a or From space 86b or POM generation space 90 into old generation space 88.

Process Block 136 represents completion of the copying of objects for a Scavenge. In this phase the objects C1 copied into To Space 86b or Old generation 88 since the start of the scavenge are traversed. For any object C2 referenced by an object C1, such that the object C2 is still residing in From Space 86c or Pom Space 90, the object C2 is copied to To space 86b or Old Generation 88 as appropriate. The operation of process block 136 is applied repeatedly until no more objects need be copied. It will be appreciated by persons skilled in the art that this phase is the standard completion phase of a Scavenge.

Process block 138 indicates that the spaces from which objects were copied and the dead objects (i.e., objects in Eden space 86a or From space 86c that were not copied out)

are all cleared, such as by resetting Eden space 86a and From space 86c to "empty." In one implementation, each space is described by a pointer structure in heap memory 96 (e.g., start address, highest used address, end of space address). To reset to empty, the highest used address may be set equal to the start address.

The descriptions of virtual machines according to the present invention have been directed to server virtual machines in a three-tier transactional database environment. While it has been illustrative of many aspects of the invention, a transactional database environment is not the only environment in which this invention can be applied. Similarly, it will be appreciated that while a server virtual machine illustrates the benefits and functionality of multiple workspaces multiple views of persistent objects, client virtual machines can also benefit from multiple workspaces and multiple views of persistent objects.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A computer readable medium having a virtual machine object memory structure with a new generation space and an old generation space within which are stored or referenced objects that are copies of persistent objects in a persistent object memory, the new generation space and the old generation space supporting generational garbage collection of the stored or referenced objects, the improvement comprising:

a permanent object memory space within which is stored or referenced objects that are copies of persistent objects in the persistent object memory, the permanent object memory space receiving copies of persistent objects directly from the persistent object memory and being subject to garbage collection other than the generational garbage collection applied to the new generation space and the old generation space.

2. The medium of claim 1 in which the new generation space undergoes garbage collection in accordance with a component of it being full and the permanent object memory space separately undergoes garbage collection in accordance with the permanent object memory space being full.

3. The medium of claim 2 in which the permanent object memory space further comprises:

plural memory locations in which plural objects are stored in the memory locations at different times, including an oldest object that is stored in a memory location prior to other objects in the permanent object memory space, the garbage collection of the permanent object memory space clearing the memory location with the oldest object prior to clearing memory locations with other objects.

4. The medium of claim 3 in which the permanent object memory space operates in a circular manner so that the plural objects are stored in successive memory locations in sequence with the times at which the objects are stored.

5. The medium of claim 2 in which the permanent object memory space further comprises:

plural memory locations in which plural objects that are stored in the memory locations at different times, including an oldest object that is stored in a memory location prior to other objects in the permanent object memory space, one or more of the objects being live and one or more of them being dead, the garbage collection of the permanent object memory space clearing the memory location with the oldest live object prior to clearing memory locations with other live objects.

6. The medium of claim 2 in which the permanent object memory space further comprises:

plural memory locations in which plural objects that are stored in the memory locations, one or more of the objects being live and one or more of them being dead, the garbage collection of the permanent object memory space including copying a live object from a memory location in the permanent object memory space into the new generation space.

7. The medium of claim 6 in which the plural objects are stored in the memory locations at different times, including an oldest object that is stored in a memory location prior to other objects in the permanent object memory space, the garbage collection of the permanent object memory space including copying an oldest live object from a memory location in the permanent object memory space into the new generation space.

8. The medium of claim 1 further comprising as a Remembered Set a region of virtual address space that is separate from and corresponds to the object memory, the Remembered Set including a new generation remembered set, an old generation remembered set, and a permanent object memory generation remembered set that correspond to, respectively, the new generation space, the old generation space, and the permanent object memory generation space.

9. In virtual machine garbage collection software on a computer-readable medium for providing generational garbage collection of objects that are copies of persistent objects maintained in a persistent object memory, the generation garbage collection being provided with reference to a new generation space and an old generation space within which are stored or referenced objects that are copies of persistent objects in a persistent object memory, the improvement comprising:

software instructions for establishing a permanent object memory space within which is stored or referenced objects that are copies of persistent objects in the persistent object memory, the permanent object memory space receiving copies of persistent objects directly from the persistent object memory and being subject to garbage collection other than the generational garbage collection applied to the new generation space and the old generation space.

10. The medium of claim 9 further comprising software instructions for subjecting the new generation space to garbage collection in accordance with a component of the new generation space being full and software instructions for separately subjecting the permanent object memory space to garbage collection in accordance with the permanent object memory space being full.

11. The medium of claim 10 in which the permanent object memory space includes plural memory locations in which plural objects are stored in the memory locations at different times, including an oldest object that is stored in a memory location prior to other objects in the permanent object memory space, the medium further comprising:

software instructions for clearing the memory location with the oldest object prior to clearing memory locations with other objects during garbage collection of the permanent object memory space.

12. The medium of claim 11 further comprising software instructions to operate the permanent object memory space in a circular manner so that the plural objects are stored in successive memory locations in sequence with the times at which the objects are stored.

13. The medium of claim 10 in which the permanent object memory space includes plural memory locations in which plural objects that are stored in the memory locations at different times, including an oldest object that is stored in a memory location prior to other objects in the permanent object memory space, one or more of the objects being live and one or more of them being dead, the medium further comprising:

software instructions for clearing the memory location with the oldest live object prior to clearing memory locations with other live objects during garbage collection of the permanent object memory space.

14. The medium of claim 10 in which the permanent object memory space including plural memory locations in which plural objects that are stored in the memory locations, one or more of the objects being live and one or more of them being dead, the medium further comprising:

software instructions for copying a live object from a memory location in the permanent object memory space into the new generation space during garbage collection of the permanent object memory space.

15. The medium of claim 14 in which the plural objects are stored in the memory locations at different times, including an oldest object that is stored in a memory location prior to other objects in the permanent object memory space, the medium further comprising:

software instructions for copying an oldest live object from a memory location in the permanent object memory space into the new generation space during garbage collection of the permanent object memory space.

16. The medium of claim 9 further comprising software instructions for establishing as a Remembered Set a region of virtual address space that is separate from and corresponds to the object memory, the Remembered Set including a new generation remembered set, an old generation remembered set, and a permanent object memory generation remembered set that correspond to, respectively, the new generation space, the old generation space, and the permanent object memory generation space.

17. In a computer readable medium having a virtual machine object memory structure, a data structure supporting generational garbage collection of the stored or referenced objects, comprising:

a new generation space and an old generation space within which are stored or referenced objects that are copies of persistent objects in a persistent object memory; and a permanent object memory space within which is stored or referenced objects that are copies of persistent objects in the persistent object memory, the permanent object memory space receiving copies of persistent objects directly from the persistent object memory and being subject to garbage collection other than the generational garbage collection applied to the new generation space and the old generation space.

18. The medium of claim 17 in which the permanent object memory space has plural memory locations in which plural objects are stored in the memory locations at different times, including an indication of oldest object that is stored in a memory location prior to other objects in the permanent object memory space.

19. The medium of claim 17 further comprising as a Remembered Set a region of virtual address space that is separate from and corresponds to the object memory, the Remembered Set including a new generation remembered set, an old generation remembered set, and a permanent object memory generation remembered set that correspond to, respectively, the new generation space, the old generation space, and the permanent object memory generation space.

* * * * *